United States Patent [19]

Virgilio

[11] 4,070,978

[45] Jan. 31, 1978

[54] FLOATING APPARATUS FOR WEEDING AND DREDGING WATERWAYS

[76] Inventor: Del P. Virgilio, 54 Greenings Ave., Pittsfield, Mass. 01201

[21] Appl. No.: 701,758

[22] Filed: July 1, 1976

[51] Int. Cl.² .............................................. B63B 35/28
[52] U.S. Cl. ........................................ 114/26; 9/1.2; 56/8; 37/54
[58] Field of Search ............... 114/.5 RC, .5 D, 16 R, 114/26; 37/54, 71, 103, 183 R, 142.5, 182; 115/1 R, 1 A; 9/1.2; 56/8, 9

[56] References Cited

U.S. PATENT DOCUMENTS

| 623,804 | 4/1899 | Muehle | 114/26 |
|---|---|---|---|
| 723,485 | 3/1903 | Perry | 114/26 |
| 767,536 | 8/1904 | Williams | 114/26 |
| 2,699,135 | 1/1955 | Steiner | 114/26 |
| 3,755,838 | 9/1973 | Dunagan | 9/1.2 |
| 3,765,156 | 10/1973 | Porter | 37/54 |

*Primary Examiner*—Trygve M. Blix
*Assistant Examiner*—D. W. Keen
*Attorney, Agent, or Firm*—Francis X. Doyle

[57] ABSTRACT

A floating apparatus including a barge having a plurality of hydraulically actuated stabilizers for positioning the barge at a location. An hydraulically actuated, articulated boom is rotatably mounted on the barge and provided with any of a plurality of instrumentalities at the free end thereof for weeding, dredging or cleaning waterways.

2 Claims, 6 Drawing Figures

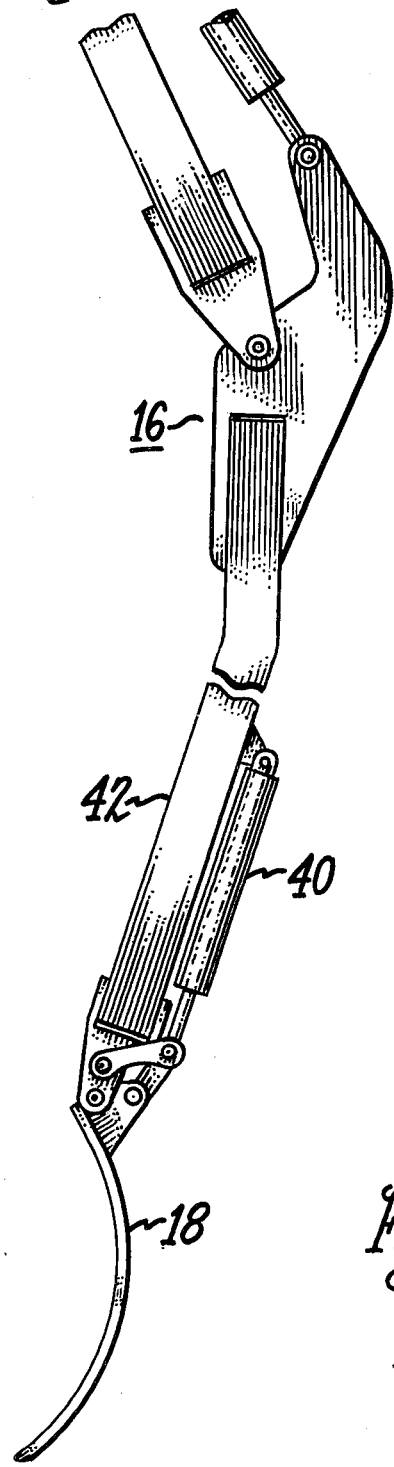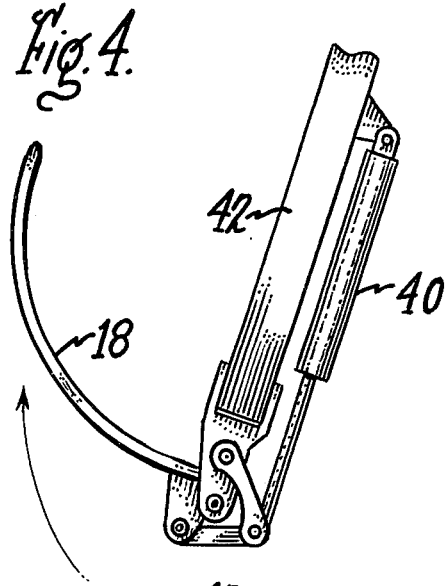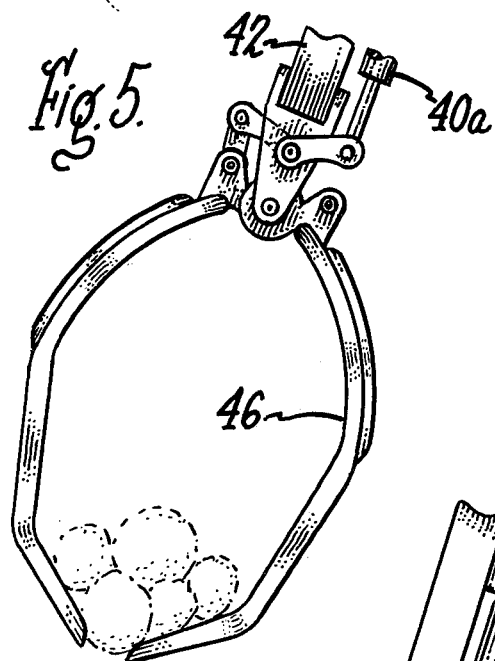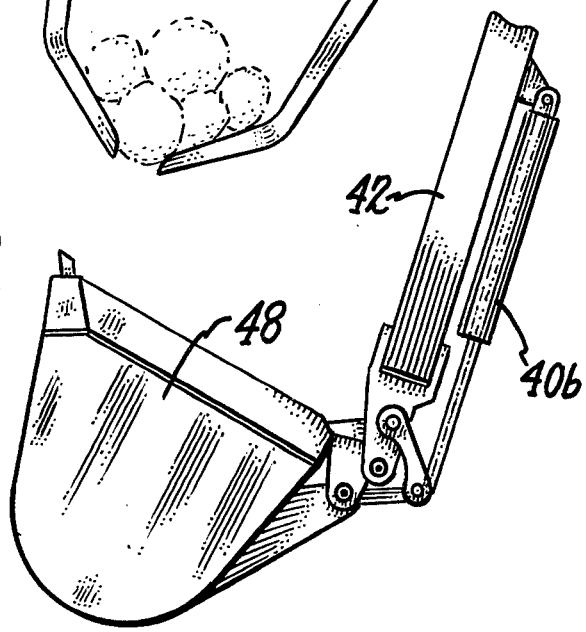

FLOATING APPARATUS FOR WEEDING AND DREDGING WATERWAYS

BACKGROUND OF THE INVENTION

This invention relates to floating apparatus for cleaning waterways.

Throughout the country there are numerous waterways, such as ponds, lakes and canals that are choked with weeds and other debris that make such waterways unsuitable for boating, fishing and the like. Various methods have been devised over the past years to eliminate these obstacles. For example, it is well known to utilize chemicals to attempt to eliminate weeds and the like from various waterways. However, the effect of such chemicals is usually to eliminate the weeds for a year or more, but cause their return in greater abundance in following years. The removal of other debris is usually done on an intermitent basis, such as the annual clean up and the like, which are known throughout the country. One type of device for mechanical cleaning waterways is shown in U.S. Pat. No. 3,751,887 which is a device for mounting on land near canals and the like and utilizing a mowing receptacle for cleaning the weeds and other growth. A similar device which is floatable and utilized as a turtlegrass harvester is shown in U.S. Pat. No. 3,765,156.

Many of these devices, both land based and water based, are found undesirable in that they do not provide sufficient mobility or they do not provide adequate means for removing the debris or weeds and placing them in a container or the like for removal from the waterway. Further, they do not usually provide for different instrumentalities such that other than weeds may be removed. Thus, there is presently a great need for an apparatus which can be used on the waterway to readily clean out weeds, debris and the like from the country's waterways, one which is readily movable over the waterways and one which will substantially eliminate the need for chemical treatment of such waterways.

It has recently been discovered that a floating apparatus can be provided equipped with an articulated boom which can be used to remove weeds and other debris from waterways in an efficient and economical manner.

SUMMARY OF THE INVENTION

In carrying out this invention in one form, a floating apparatus is provided which includes a barge member having an articulated boom device including anyone of a plurality of instrumentalities to clear a waterway of weeds of other debris. The barge is equipped with a plurality of stabilizing members which are used to position the barge member in a given location to perform the desired clean-up function. In the preferred embodiment a motor means is provided to move the barge and its apparatus from one location to another.

The invention which is sought to be protected will be particularly pointed out and distinctly claimed in the claims appended hereto. However, it is believed that this invention and the manner in which its various objects and advantages are obtained, as well as other objects and advantages hereof will be better understood by reference to the following detailed description of a preferred embodiment thereof, particularly when considered in the light of the accompanying drawings.

BRIEF DESCRIPTION OF THE DRAWINGS

FIG. 3 is a partial detailed plan view of the preferred articulated boom and the rake device of this invention;

FIG. 4 is a partial detailed plan view of the boom and rake member of FIG. 3 showing another position of the rake member;

FIG. 5 is a partial detailed plan view showing an instrumentality such as a clam shell mounted on the end of the articulated boom in place of the rake member; and FIG. 6 is a partial detailed plan view showing another instrumentality on the end of the articulated boom.

DESCRIPTION OF THE PREFERRED EMBODIMENT

Figure 1:
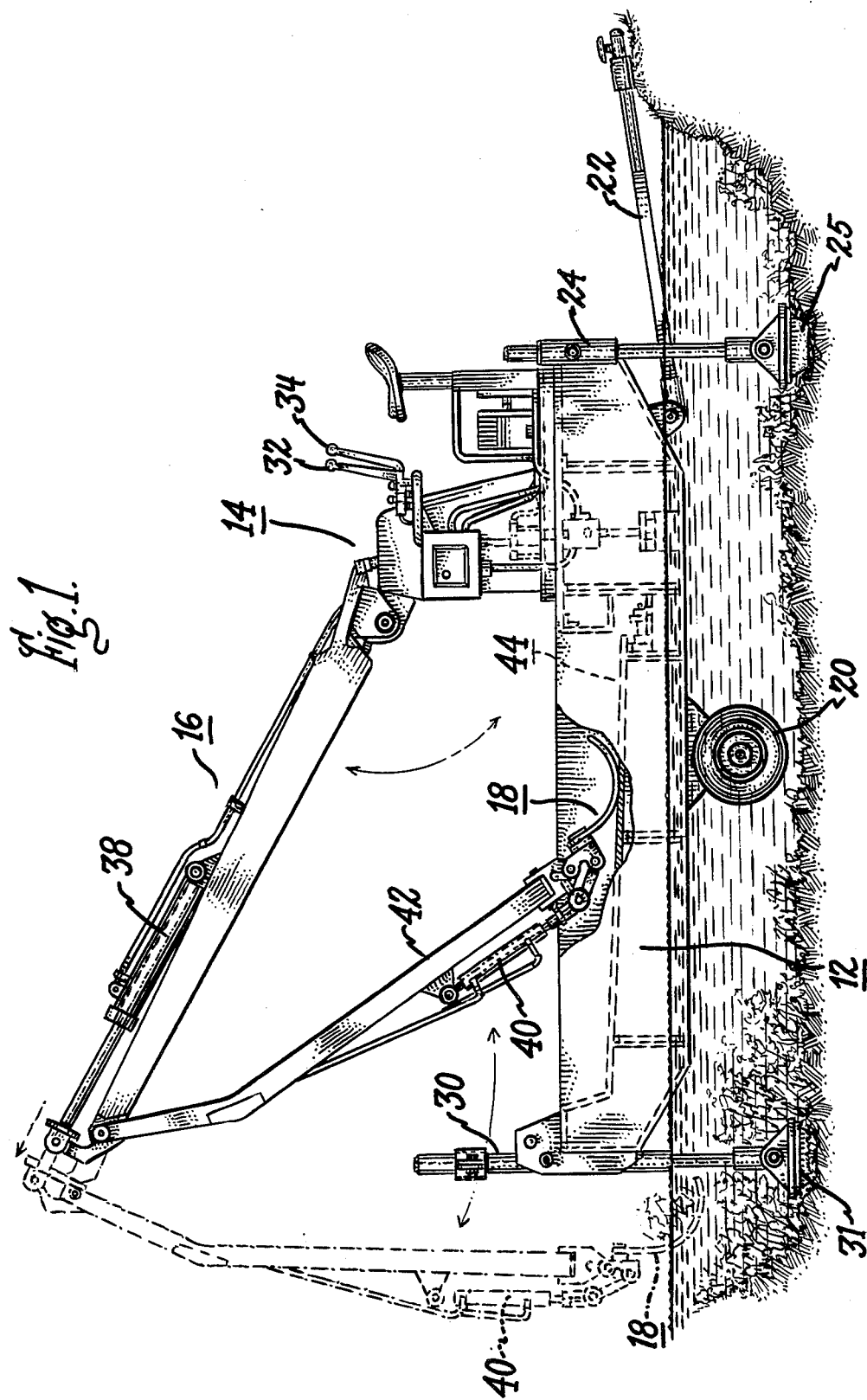
FIG. 1 is a plan view of the preferred embodiment of the floating weed and cleaning apparatus of this invention shown with the weeding rake member attached.
Figure 2:
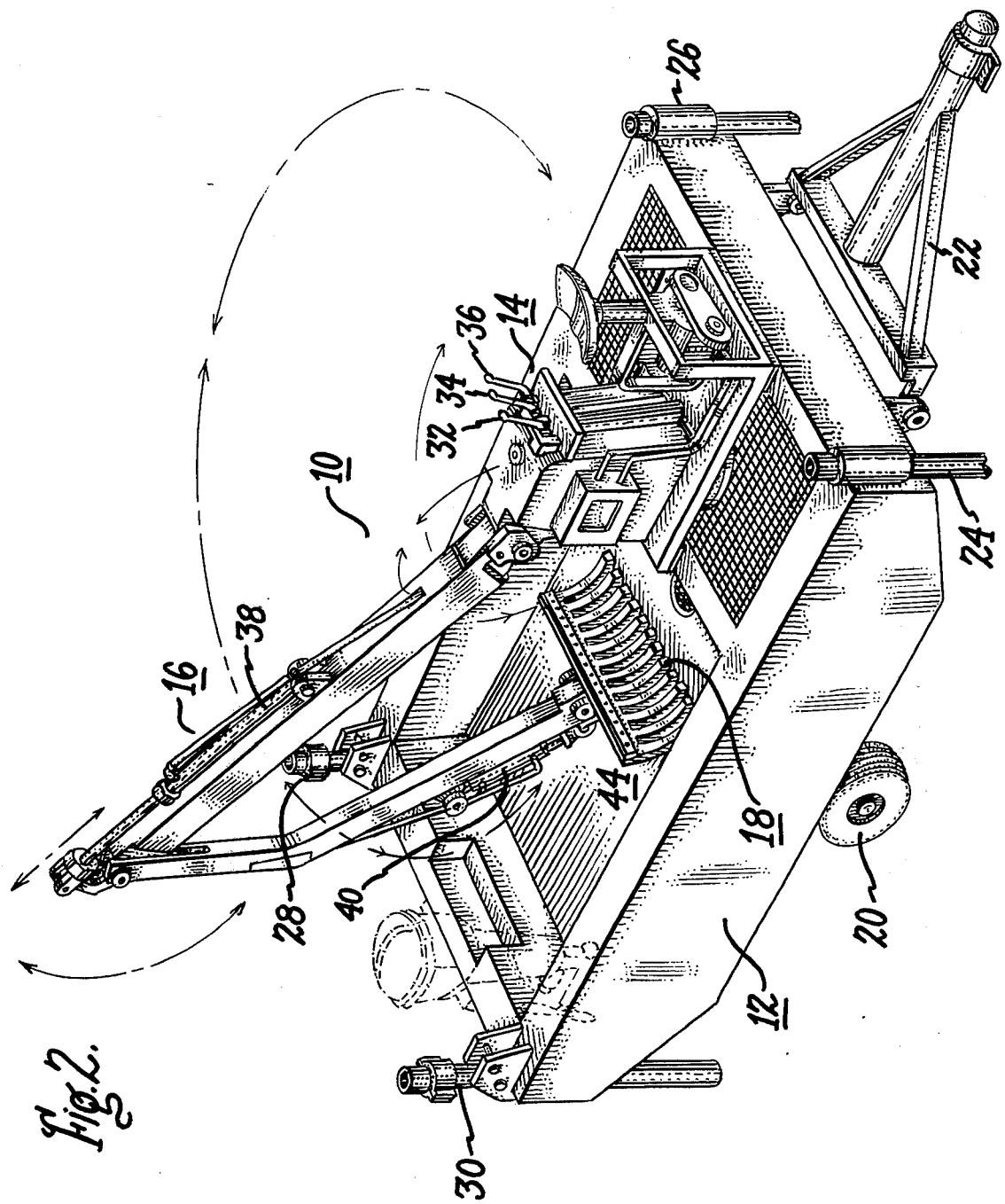
FIG. 2 is a perspective view of the preferred embodiment shown in FIG. 1.

Reference will now be made to the drawings wherein like numerals are used to indicate like parts throughout the various views thereof. Referring first to FIGS. 1 and 2, there is shown, a plan and perspective view of the preferred embodiment of the floating weed cleaning apparatus 10. As can be seen from FIGS. 1 and 2, apparatus 10 comprises a barge member 12 including a hydraulic actuating device 14 which actuates the articulated hydraulic boom 16 and includes an instrumentality 18 such as for example, a rake member mounted on the free end of boom 16. In the preferred embodiment shown, the barge member 12 is provided with wheels 20 for moving the barge from one waterway to another and a hitch member 22 which may be utilized in a well known manner for moving the barge by means of a truck or similar device. In the preferred embodiment, as is shown in FIGS. 1 and 2, stabilizers 24, 26, 28 and 30 are provided on the corners of the barge 12 for stabilizing the floating barge in a given location in a waterway such that the boom 16 and rake 18 may be used to remove debris or the like from the waterway without tipping barge 12. The stabilizers 24, 26, 28 and 30 may be provided with hydraulic actuators for raising and lowering the stabilizers in the manner which will be well understood by those skilled in this art. The stabilizers 24, 26, 28 and 30 may also be provided with any desired base parts, such as 25 and 31, to engage the floor or bottom of the waterway, as shown in FIG. 1.

The articulated boom 16 is actuated by means of a hydraulic control device 14, which utilizes hydraulic valve members 32, 34, 36 as will be well understood. Obviously, the control valves 32, 34 and 36 will operate through the hydraulic lines and actuate the articulated boom 16 moving it up and down and also traversing the entire 360° rotation about the barge 12.

In the preferred embodiment, especially as shown in FIG. 2, control device 14 rotates as a unit to allow the operation to observe the movement of boom 16 and rake, or other instrumentality, 18. As will be understood, the control valves 32, 34 and 36 will actuate the hydraulic members such as 38 on the upper portion of articulated boom 16, and 40 which is on the lower or free end 42 of boom 16 and operates in conjunction with the rake 18 or other instrumentality, as is shown in particularly in FIGS. 1 and 2.

As above mentioned, the articulated boom 16 is mounted on the hydraulic control member 14 for both movement upward and downward in the manner indicated particularly in the dashed lines in FIG. 1 and also for rotating with control member 14 360° about the barge as is indicated by the arrowed lines in FIG. 2. As will be understood, the boom 16 will be raised and the desired instrumentality such as, for example, the rake 18 will be lowered to the bottom of the waterway. The boom will then be moved over the waterway and the rake will gather weeds and other debris which can then be lifted in the manner particularly indicated in FIG. 4 and deposited in the container portion 44 of the barge as is particularly shown in FIGS. 1 and 2.

As is shown particularly in FIGS. 3 and 4, the outer end 42 of the boom 16 is provided with a hydraulic member 40, which actuates the instrumentality, in this instance, the rake 18. As is apparent from FIG. 3, the rake is first positioned in the extended position by means of actuation of the hydraulic cylinder 40 for scraping the bottom of the waterway to clean it from weeds and other debris. After the rake has made its traverse over the bottom of the waterway, cylinder 40 will be actuated in the manner shown in FIG. 4 to move the raking device into a bucket-type position or catching position where the debris may be lifted from the waterway and deposited in the container portion 44 of the barge 12 in the manner shown in FIGS. 1 and 2. Obviously, the rake may be utilized throughout the entire 360° range of movement around and along the barge 12 so as to clean all of the weeds or other debris from the base of the waterway. After cleaning the area in which the barge has been placed, as will be understood the barge may be moved by means of an outboard motor as is shown in phantom lines in FIG. 2. At a further location the stabilizers 24-30 will again be utilized to stabilize the barge 12 in such location so that further cleaning of the waterway can be taken.

As will be understood, the barge 12 may be of any desired size and may be powered by inboard or outboard means, such as a gasoline or diesel engine.

As will be understood, other instrumentalities other than the rake 18 may be utilized with the articulated boom 16 of this invention. FIG. 5 shows the use of a clam shell member 46 which may be used for picking up large pieces of debris for example, sunken logs, rocks and other members which may be cluttering the waterway. As shown in FIG. 5, the clam shell 46 is mounted on the outer end of 42 of the articulated boom 16 and the hydraulic cylinder 40a is used to open and close the clam shell 46 as will be well understood.

FIG. 6 shows the use of a back hoe 48 attached to end 42 of boom 16. Of course backhoe 48 will also be actuated by a cylinder 40b. The backhoe attachment 48 would be useful for digging trenches along and across waterways, swamps and the like, for the placement of pipes, cables and the like. Obviously, other instrumentalities could be used, if desired.

While there has been shown and described the present preferred embodiment of this invention, it will be understood by those skilled in the art that various changes may be made in the combination without departing from the spirit and scope of the invention particularly as such invention is defined in the appended claims.

What is claimed as new and which it is desired to secure by Letters Patent of the United States is:

1. A floatable device for cleaning waterways comprising, in combination,
   a. a barge member
      1. said barge member having a container portion for receiving debris cleaned from a waterway,
   b. an articulated boom member rotatably mounted on said barge member,
   c. control means mounted on said barge for articulating and rotating said boom member,
   d. an instrumentality mounted on the free end of said boom member for cleaning waterways,
      1. said instrumentality moved with said boom member by said control means and also separately actuated by said control means,
   e. stabilizer means mounted on said barge and movable to engage the bed of a waterway to prevent tipping of said barge when said boom member and said instrumentality are actuated to clean the waterway, and
   f. said barge member in the form of a trailer movable from waterway to waterway.

2. A floatable device as claimed in claim 1 in which motor means are provided for moving said barge along a waterway.

* * * * *